United States Patent [19]

Tolley

[11] 4,225,564
[45] Sep. 30, 1980

[54] PURIFICATION OF RUTILE
[75] Inventor: William K. Tolley, Arlington Heights, Ill.
[73] Assignee: UOP Inc., Des Plaines, Ill.
[21] Appl. No.: 13,932
[22] Filed: Feb. 22, 1979
[51] Int. Cl.$^2$ .............................................. C01G 23/04
[52] U.S. Cl. ...................................... 423/81; 423/69; 423/82; 423/610
[58] Field of Search ....................... 423/69, 610, 81, 82
[56] References Cited

U.S. PATENT DOCUMENTS

| 3,337,300 | 8/1967 | Hughes | 423/610 |
| 3,803,287 | 4/1974 | Fukushima et al. | 423/74 |
| 3,950,489 | 4/1976 | Fukushima | 423/74 |
| 4,081,507 | 3/1978 | Dunn | 423/610 |
| 4,083,946 | 4/1978 | Schun et al. | 423/610 |

FOREIGN PATENT DOCUMENTS

| 45-9659 | 4/1970 | Japan | 423/610 |
| 45-18371 | 6/1970 | Japan | 423/610 |
| 430134 | 10/1974 | U.S.S.R. | 423/610 |

OTHER PUBLICATIONS

Schumb et al., "Hydrogen Peroxide," Reinhold Pub. Corp., N. Y. 1955, pp. 396, 397, 588.

Primary Examiner—Herbert T. Carter
Attorney, Agent, or Firm—James R. Hoatson, Jr.; Raymond H. Nelson; William H. Page, II

[57] ABSTRACT

Rutile, which has been obtained by precipitation from a hydrogen chloride solution will contain a relatively large amount of residual chlorine containing compounds such as the various forms of titanium chloride. These residual chlorine containing compounds may be removed in an economical way by treating the rutile with hydrogen peroxide in an acidic solution at relatively low temperatures to substantially reduce the chloride content of the product.

5 Claims, No Drawings

PURIFICATION OF RUTILE

BACKGROUND OF THE INVENTION

Titanium in metallic form or as a compound is an important element in the chemical series. For example, titanium dioxide is utilized in paint pigments, in white rubbers and plastics, floor coverings, glassware and ceramics, painting inks, as an opacifying agent in papers, etc. The other titanium compounds are used in electronics, as fire retardants, waterproofing agents, etc. The metal may be used as such or in alloy form as structural material in aircraft, in jet engines, marine equipment, textile machinery, surgical instruments, orthopedic appliances, sporting equipment, food handling equipment, etc. Heretofore in recovering the titanium from titanium bearing sources such as ilmenite, rutile, etc., the titanium has been subjected to separation steps which involve the formation of titanium as a compound in a valence state of +4, such compounds usually involving titanium oxide. However, when attempting to separate titanium dioxide from impurities which are also contained in the ore such as iron, the hydrolysis of the titanium dioxide at elevated temperatures usually results in also obtaining relatively large amounts of iron along with the titanium.

Heretofore in the prior art various methods have been utilized to recover titanium values from titanium bearing sources. For example, in U.S. Pat. No. 3,236,596 an unroasted ilmenite ore is leached with hydrogen chloride at an elevated temperature. Following this, dissolved iron is reduced with iron or other reductants to precipitate ferrous chloride by saturating the liquor with hydrogen chloride gas. The hydrogen chloride is then extracted from the liquor by a vacuum distillation and the titanium is recovered by conventional means. Likewise, U.S. Pat. No. 3,825,419 reduces an ilmenite ore to produce ferrous oxides. The reduced ore is then leached for about 4 hours under a moderate pressure thereby dissolving the iron in the acid along with about 15% of the titanium. The iron is recovered as ferric oxide containing impurities in the spray roaster while the insoluble product which is primarily titanium dioxide but which contains all of the silica present in the original ore is recovered. U.S. Pat. No. 3,859,077 also discloses a process for recovering titanium in which a titanium tetrahalide is mixed with iron oxide in slag or a titaniferous ore at an extremely high temperature of about 1000° C. to produce volatile impurity chlorides and titanium dioxide. A similar patent, U.S. Pat. No. 3,929,962, also reduces a titanium bearing ore at a high temperature to produce titanium sesquioxide which is in a form whereby it is easier to treat for a titanium-iron separation. Another prior art reference, U.S. Pat. No. 3,903,239, teaches a method for recovering titanium in which unroasted ilmenite is leached over a period of days at room temperature to recover about 80% of the titanium. Sulfur dioxide is added during the leaching to cause a precipitation of the ferrous chloride after which titanium dioxide is recovered by diluting and heating the solution.

As will hereinafter be shown in greater detail, it is now possible to obtain titanium dioxide in the form of rutile which contains substantially less residual chlorine containing compounds and therefore will be in a purer state.

This invention relates to a process for the removal of contaminating elements which may be present in rutile. More specifically, the invention is concerned with a process for the removal of unwanted residual chlorine containing compounds which are present when rutile has been precipitated from a hydrochloric acid solution. By utilizing the process of the present invention, it will be possible to obtain titanium metal values in a purer state.

It is therefore an object of this invention to provide an improved process for the production of titanium metal values.

A further object of this invention is to provide a hydrometallurgical process for obtaining relatively pure titanium metal values in the form of rutile from titanium bearing sources such as ilmenite.

In one aspect an embodiment of this invention resides in a process for the removal of residual chlorine containing compounds from rutile which comprises treating said rutile with a solution containing hydrogen peroxide at treatment conditions, and recovering the resultant purified rutile.

A specific embodiment of this invention is found in a process for the removal of residual chlorine containing compounds from rutile which comprises treating said rutile with a solution of hydrogen peroxide in the presence of a mineral acid such as sulfuric acid at a temperature in the range of from about 25° to about 100° C. and recovering the purified rutile.

Other objects and embodiments will be found in the following further detailed description of the present invention.

As hereinbefore set forth the present invention is concerned with a process for removing residual chlorine containing compounds which may be present in rutile obtained from a titanium chloride. To obtain the desired titanium metal values, an ore source such as ilmenite or other sources such as sand which contains the desired metal, chiefly titanium, as well as amounts of other metals such as iron, vanadium, chromium, manganese, etc., is crushed to a particle size which is less than about 35 mesh. Thereafter the crushed metal bearing source is subjected to a reductive roast at an elevated temperature which may range from about 600° up to about 1000° C. or more and preferably in a range of from about 600° to about 900° C. The reductive roast is effected for a period of time ranging from about 0.5 up to about 2 hours or more in the presence of a reducing gas such as hydrogen, carbon monoxide, combinations of carbon monoxide and hydrogen, etc., or any other suitable reductant. One particularly effective reducing atmosphere which is used to accomplish the purpose of the roast usually comprises a mixture of about 50% carbon monoxide and 50% hydrogen, with an excess of reductant being utilized in order to completely reduce the iron which is present in the ore source to metallic form. If so desired, the crushed ore may be subjected to an oxidation roast prior to the reductive roast, said oxidative roast also being accomplished at a temperature in the range of from about 600° to about 900° C. in the presence of an oxidizing atmosphere which is provided for by the presence of air or oxygen. However, it is to be understood that this step is not a necessary part of the process. Following the reductive roast of the metal bearing source, the source is then subjected to an aqueous hydrogen halide leach which, in the preferred embodiment of the process, comprises an aqueous hydrogen chloride leach although other hydrogen halides such as hydrogen bromide and hydrogen iodide may also be utilized, although not necessarily with equivalent results. The aforesaid leach of the metal bearing source is usually effected at a temperature which may range from about ambient up to about 110° C., the preferred range being from about 80° to about 100° C. for a period of time ranging from about 0.25 hours up to about 1 hour or more in duration.

Following the leach of the metal bearing source which will form soluble iron halides and titanium halides such as ferrous chloride, titanium trichloride, etc., the mixture is subjected to a separation step in which the solid gangue is separated from the soluble metal chlorides and discarded. The separation of the solid gangue from the soluble metal chlorides may be effected in any suitable manner by means well known in the art, said means including decantation, filtration, centrifugation, etc.

In one embodiment of the process the soluble metal halides may then be cooled to a temperature sufficient to effect the crystallization or precipitation of the ferrous chloride. For example, the temperature at which the crystallization or precipitation of the ferrous chloride is effected may range from about 0° to slightly in excess of ambient or as high as 90° C. in extreme cases. When using subambient temperatures, the cooled solution is maintained in the subambient range by external means such as an ice bath, cooling coils, etc. After crystallization of the ferrous chloride is completed, the solids are separated from the dissolved titanium chloride such as titanium trichloride by conventional means such as filtration, decantation, etc.

The desired titanium dioxide in the form of rutile is obtained by treating the remaining leach solution containing aqueous titanium trichloride with a metal oxide and preferably an iron oxide such as ferric oxide. The latter compound may be obtained by oxidizing the solid ferrous chloride which has been separated and recovered from the leach solution in any manner known in the art. For example, the ferrous chloride may be oxidized at temperatures ranging from about 300° to about 800° C. in contact with an oxygen-containing gas such as air or oxygen whereby the ferrous chloride is converted to ferrous oxide and ferric oxide, the latter compound being the predominant form of the iron oxide. The treatment of the leach solution containing titanium trichloride to nucleate the hydrolysis reaction is effected by adding the iron oxide material to the leach solution. However, the application of the present invention is not limited to rutile obtained by the above method and may be used wherever titanium dioxide is to be treated to remove residual halide compounds.

The rutile which is precipitated from the treatment with the ferric oxide will also contain a relatively large amount of residual chlorine containing compounds such as residual titanium chlorides. In the prior art, most treatments which are utilized to remove this residual chloride require heating the rutile to relatively high temperatures, that is, about 600° to about 900° C. However, the disadvantage which is present when utilizing this method to remove the residual chlorine containing compound is that the heat treatment often results in sintering with a concurrent discoloration of the product. This disadvantage is readily apparent when utilizng the rutile or titanium dioxide for purposes which require a substantially white titanium dioxide. However, as will hereinafter be shown, it is possible to remove the residual chloride species from the rutile at relatively low temperatures thereby avoiding the discoloration of the desired product.

The obtention of relatively pure rutile by utilizing the process of the present invention involves slurrying the rutile which contains residual chloride species with hydrogen peroxide in an acidic medium. The hydrogen peroxide which is used is usually present in an amount in the range of from about 0.5 to about 2.0% by weight of the rutile. In addition, the acidic medium which is afforded by the addition of inorganic acids such as sulfuric acid, nitric acid, phosphoric acid, etc., will prevent the precipitation of any iron hydroxides which may be present. The treatment of the rutile solution with the hydrogen peroxide is effected at temperatures in the range of from about 25° to about 100° C. and preferably in a range of from about 70° to about 80° C. for a period of time which may range from about 0.5 up to about 2 hours or more in duration. In the preferred embodiment of the invention, the treatment of the rutile is effected during the washing of the freshly precipitated rutile after treatment with the ferric oxide and separation from the leach solution.

Following the treatment of the rutile with the hydrogen peroxide in an acidic medium the purified rutile is then separated from the solution by any means known in the art such as decantation, filtration, etc., and recovered for storage.

The process of the present invention may be effected in any suitable manner and may comprise either a batch or continuous type operation. For example, in one embodiment of the process when a batch type operation is to be employed, the titanium bearing source which has been crushed or ground to the desired particle size, usually in a range of from about −35 to about −100 mesh, is placed in an apparatus such as an oven wherein it is roasted at a temperature within the range hereinbefore set forth while subjecting the ore to a reducing atmosphere such as a mixture of carbon monoxide and hydrogen. Upon completion of the reductive roast the crushed ore is then placed in a second vessel wherein it is subjected to a leaching operation by contact with an aqueous hydrogen halide such as concentrated hydrochloric acid while maintaining the temperature in a range of from about 80° to about 105° C. Upon completion of the desired leaching operation, the solid material such as gangue and/or insoluble metal compounds are separated from the pregnant leach liquor which is then recovered. The pregnant leach liquor containing the soluble titanium chlorides and ferrous chloride may then be placed in a flask or other such apparatus which is then cooled or maintained at a relatively cool temperature whereby the ferrous chloride will crystallize out of the solution. After precipitation of the ferrous chloride, the leach liquor containing the soluble titanium chloride is separated from the solid ferrous chloride by conventional means such as filtration, decantation, centrifugation, etc., and placed in yet another apparatus where it is contacted with an excess of ferric oxide, the apparatus in which the contact is made containing heating means as well as agitation means whereby the mixture may be agitated by means of mechanical stirrers or other means in order to maintain the solution in an agitated state during the precipitation period which may range from about 1 to about 10 minutes or more in duration. Upon completion of the desired precipitation period and with the attendant formation of titanium dioxides, the solids are separated and subjected to a wash operation and to treatment with hydrogen peroxide in an amount in a range hereinbefore set forth, said contact being effected in an acidic medium which is supplied by the utilization of an acid also of the type hereinbefore set forth. Thereafter, the purified rutile is separated from the liquid and recovered.

Alternatively, if so desired, the pregnant leach liquor which has been recovered following separation from the insoluble gangue may be treated at an elevated temperature with ferric oxide prior to removal of the ferrous chloride which is present in the leach liquor along with the titanium chlorides. After treating the leach liquor with the excess ferric oxide in a manner similar to that hereinbefore set forth, the solid titanium dioxide in the form of rutile is recovered and treated with hydrogen peroxide in an acidic medium in a manner hereinbefore set forth while the soluble ferrous chloride originally present in the leach liquor and the additional ferrous chloride which is formed by the reaction between ferric oxide and titanium chloride may then be precipitated by cooling the liquor to form crystalline ferrous chloride. The ferrous chloride thus recovered may be treated in either a reduction step or oxidation step. If the former step is effected, that is, the direct reduction of ferrous chloride by treatment with hydrogen at an elevated temperature, the resulting metallic iron which is formed may be recovered while any hydrogen chloride may be recycled to the leach liquor. Alternatively, as the ferrous chloride is subjected to an oxidation step by treatment with oxygen or an oxygen-containing gas at an elevated temperature the ferric oxide which is formed thereby may be recycled to the titanium dioxide recovery step, said ferric oxide acting as the precipitation reagent.

It is also contemplated within the scope of this invention that the process may be effected in a continuous manner of operation. When such a type of operation is used, the ore which has been crushed or ground to the desired particle size is passed through an apparatus such as an oven at a predetermined rate of speed while being subjected to the action of a reducing atmosphere such as hydrogen or a combination of carbon monoxide and hydrogen while maintaining the temperature of the oven in a range of from about 600° to about 1000° C. After completing the passage through the oven, the reduced ore is continuously charged to a leaching zone wherein it is contacted with an aqueous leach solution comprising a hydrogen halide, such as hydrogen chloride, and after passage through the leading zone which is maintained at an elevated temperature within the range hereinbefore set forth, the solution containing the soluble metal chloride such as iron chloride and titanium chloride is separated from the solid gangue material. In one embodiment the pregnant leach liquor is then continuously charged to a crystallization zone which is maintained at a lower temperature to facilitate the precipitation or crystallization of the ferrous chloride. The leach liquor containing the soluble titanium chloride is continuously withdrawn from this zone and passed to a precipitation zone wherein it is contacted with an excess of ferric oxide while maintaining the solution in an agitated state. The solution which contains solid titanium dioxide and soluble ferrous chloride may then be separated and the rutile, in another zone, is contacted with hydrogen peroxide in an acidic medium at a temperature in the range of from about 25° to about 100° C. whereby any residual chlorine containing compounds such as titanium chlorides in various valence states are separated from the rutile, the latter then being recovered and treated in a conventional manner. The ferrous chloride which has been separated from the leach liquid may, if so desired, be passed to an oxidation zone wherein it is contacted with an oxygen-containing gas at an elevated temperature of from about 300° to about 800° C. to form ferric oxide, this compound then being used to treat the leach liquor containing the soluble titanium chloride, while the hydrogen chloride which is formed during the oxidation reaction is recycled to the leach zone to form a portion of the leaching solution charge stock.

Alternatively, the pregnant leach liquor which has been separated from the solid gangue material may be treated with ferric oxide before the ferrous chloride has been precipitated out. The contact with the ferric oxide is in a manner similar to that previously described following which the solid titanium dioxide which is formed continuously withdrawn and recovered. After recovery of the solid titanium dioxide it is continuously passed to another zone wherein it is contacted with hydrogen peroxide in an acidic medium, said hydrogen peroxide also being continuously charged to this zone. After treatment in this zone with the hydrogen peroxide, the purified titanium dioxide is continuously withdrawn, recovered and treated in a conventional manner. The soluble ferrous chloride solution which has been separated from the solid titanium dioxide by conventional separation means and which contains an added amount of ferrous chloride due to the formation of the same during the precipitation of titanium dioxide, is crystallized by being continuously passed to a crystallization zone which is maintained at a lower temperature. Thereafter the solid ferrous chloride may be continuously withdrawn from this crystallization zone and treated in either a direct reduction step or an oxidation step to afford the desired metallic iron or ferric oxide, if so desired.

The following example is given for purposes of illustrating the process of this invention. However, it is to be understood that this example is given merely for purposes of illustration and that the present process is not necessarily limited thereto.

EXAMPLE

A Canadian ilmenite ore was coarsely ground in a crusher to −65 mesh and thereafter was roasted for a period of 1 hour at 750° C. under a flow of 650 ml/min. each of hydrogen and carbon monoxide. At the end of this roasting time, 50 grams of the reduced ore was mixed with 300 ml of hydrochloride acid and heated to a temperature of 100° C. The ore was leached at this temperature for a period of 15 minutes, following which the solution was filtered to remove insoluble gangue. After filtration the filtrate was cooled to room temperature to precipitate ferrous chloride. Following this 100 ml of the liquid was heated to 80° C. and an excess of ferric oxide was added while thoroughly agitating the solution. The reaction was allowed to proceed for a period of 5 minutes following which the solids were recovered by filtration, washed, dried and ground. The solids were analyzed and found to contain 3.75% chloride ions. Thereafter about 2 grams of the titanium dioxide containing the aforementioned chloride ion concentration was mixed with 80 ml of pH 1 sulfuric acid solution. Thereafter 2 ml of hydrogen peroxide was added to the solution and the solution was heated for a period of 1 hour while maintaining the temperature in a range of from about 70° to about 80° C. At the end of the 1 hour period heating was discontinued, the solution was filtered and the solids were washed with water and dried. Analysis of the titanium dioxide solids showed that said solids contained only 0.19% chloride ion which amounted to a 95% removal of the chloride contamination.

I claim as my invention:

1. A process for the removal of chloride-containing compounds from rutile obtained by precipitation with ferric oxide from a hydrogen chloride solution which process comprises slurrying with said rutile a solution of (1.) hydrogen peroxide in an amount in the range of from about 0.5 to about 2.0% based on the weight of said rutile and (2.) an inorganic acid at a temperature in the range of from about 25° C. to about 100° C. to complex said chloride-containing compounds, and recovering rutile relatively free of said chloride-containing compounds.

2. The process as set forth in claim 1 in which said inorganic acid is sulfuric acid.

3. The process as set forth in claim 1 in which said inorganic acid is nitric acid.

4. The process as set forth in claim 1 in which said inorganic acid is phosphoric acid.

5. The process as set forth in claim 1 in which said residual chloride containing compounds include titanium chlorides.

* * * * *